May 16, 1967 R. E. PALMATEER 3,320,057

METAL STRUCTURE FABRICATION

Original Filed Feb. 15, 1963

INVENTOR
RUSSELL E. PALMATEER
BY
ATTORNEY

United States Patent Office 3,320,057
Patented May 16, 1967

3,320,057
METAL STRUCTURE FABRICATION
Russell E. Palmateer, Emporium, Pa., assignor to Sylvania Electric Products Inc., a corporation of Delaware
Continuation of application Ser. No. 258,768, Feb. 15, 1963. This application Dec. 31, 1954, Ser. No. 422,843
4 Claims. (Cl. 75—206)

This application is a continuation of Ser. No. 258,768, filed Feb. 15, 1963, and now abandoned.

This invention relates to a powdered metal mixture and more specifically to a solidified metal structure consisting essentially of sintered powdered metal particles with homogeneously distributed refractory oxide particles therebetween and the process whereby such uniform distribution is effected.

For some time it has been known that uniformly distributed refractory oxide particles between the crystals of a solidified molten or powdered metal material would be most desirable. Among the many known advantages of such a material would be increased high temperature mechanical properties such as tensile strength, yield strength, and bend strength. Further, such a material would have not only a reduced grain size but would exhibit a reduced grain growth.

Unfortunately, although such a material would provide untold advantages in present-day manufacturing techniques, no such material has heretofore been available. While specific quantities of a material having these desirable characteristics have been manufactured, attempts to repeat the operation have thus far resulted in wide and apparently uncontrollable variations which nullify the above-mentioned advantages.

One process frequently used in attempting to provide such a material is that in which a form of refractory oxide additive is ground or powdered and the resultant finely divided particles mixed into the molten or powdered metal. Although innumerable procedures and techniques have been developed in attempts to thoroughly and uniformly distribute these finely divided particle additives, it has been found that no such uniform distribution is present in the final solidified metal product. At least the reliability and predictability of such processes leave much to be desired.

Therefore, it is an object of this invention to enhance the uniformity of a refractory oxide particle distribution in a solidified material.

Another object of this invention is to improve the dispersion of a refractory material in a powdered metal mixture.

A further object of this invention is to improve the reliability of a solidified powdered metal mixture having refractory oxide particles contained therein.

Briefly, these objects are fulfilled in one aspect of the invention by dispensing onto powdered metal particles a solution containing a soluble compound and a volatile solvent. Upon application of heat thereto, the solution becomes viscous and surrounds the metal particles whereupon it drys and tenaciously adheres. Subsequently, the film-covered particles are fired to decompose the film to refractory oxide particles which are entrapped intermediate the metal particles upon the bonding together thereof. Thus, a solidified powdered metal mixture having refractory oxide particles homogeneously dispersed intermediate the metal particles is provided.

For a better understanding of the present invention, together with other and further objects, advantages, and capabilities thereof, reference is made to the following disclosure and appended claims in connection with the accompanying drawing in which:

Figure 1:
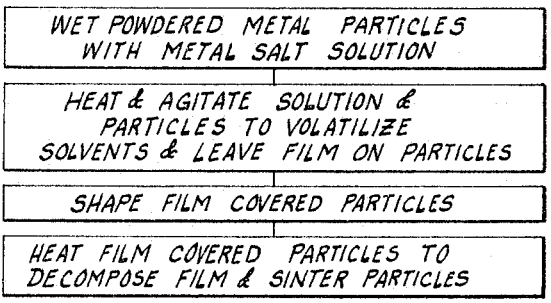
FIG. 1 is a flow chart of the powdered metal mixture process.

Referring to the drawing, FIG. 1 is a flow chart illustrating a process for providing a solidified metal mixture wherein discrete refractory oxide particles are homogeneously dispersed intermediate bonded metal particles. In this process a soluble compound is dissolved in a suitable solvent to provide a solution which is dispensed onto the particles of a powdered metal batch whereby the metal particles are thoroughly wetted. Following, the batch is heated and continuously agitated until the solvent in the solution is volatilized and there remains a dry and adherent film surrounding each of the metal particles. Thereupon, the film-covered metal particles are shaped into a desired configuration and subsequently heated to decompose the film into discrete refractory oxide particles and bond the metal particles to each other.

Although the exact reactions which occur during the sintering process are not known, it is believed that the heat causes a dehydration and decomposition of the film constitutents whereby the volume thereof is substantially reduced. Thereupon there remains refractory oxide particles which are homogeneously dispersed along the surface of the metal particles whereon the film had been attached. As a result, these refractory oxide particles are entrapped intermediate the metal particles by the bond formed therebetween during the sintering process. Thus, a solidified metal mixture having uniformly distributed refractory oxide particles therein has been provided.

Additionally, microphotographs substantiate the fact that the refractory oxide particles are uniformly dispersed intermediate the bonded metal particles, that a powdered metal mixture has a reduced grain size in comparison to a powdered metal wherein the refractory oxide was not added, and the grain growth of a powdered metal mixture upon the application of heat thereto is less than a similar powdered metal wherein the oxide particles are not present.

Figure 2:
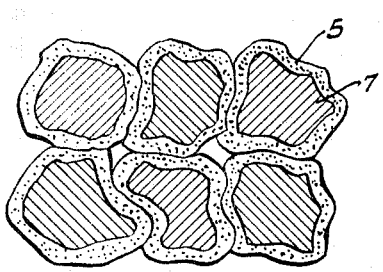
FIG. 2 illustrates the particles of the powdered metal mixture surrounded by an adherent film.
Figure 3:
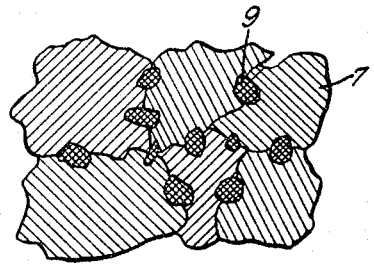
FIG. 3 illustrates the solidified metal mixture after decomposition of the film.

Referring to FIG. 2, the powdered metal particles 7 are shown surrounded by an adherent film 5 prior to the sintering of the metal particles and decomposition of the adherent film 5. Further, FIG. 3 illustrates the discrete refractory oxide particles 9 homogeneously dispersed intermediate and entrapped by the bonded metal particles 7 after the sintering and decomposition process.

In regard to appropriate materials, a soluble compound is selected from which a viscous liquid may be formed whereupon contact therewith will provide a tacky film which adheres upon drying and may be decomposed into refractory oxide particles. Regardless of whether the compound is in the form of a viscous liquid or a powder which forms a viscous liquid upon the addition of a suitable solvent, the compound should be such that the solvent removal therefrom by drying provides an adherent film which is neither crystalline and easily rubbed off nor has a tendency to jell.

Compounds having the above-mentioned desired good adherence qualities after drying and which may be also characterized as having good flow properties are generally referred to as polar compounds or compounds which include not only nonpolar molecules but, more importantly, polar molecules. As is well known, the tendency for the polar molecules to "wet" or attach themselves to a surface provides the above desired good flow and good adhesive properties.

It should be noted that the above-mentioned desirable characteristics are not to be found in hydrated oxides and colloidal metal suspensions which do not include the above-mentioned polar groups, and, consequently, may be best characterized as having relatively poor flow properties as well as poor adherence qualities upon drying. Since numerous texts such as "Inorganic Colloid Chemistry," vol. II (1935) by H. B. Weiser detailing the above-mentioned distinguishing characteristics are readily available, the discussion has been limited in the interest of brevity.

As a specific example, the basic salts of such metals as aluminum, beryllium, titanium, zirconium, hafnium, and thorium as well as combinations thereof have been found especially well adapted to the formation of soluble compounds having the above-described characteristics. Further, U.S. Patent No. 2,179,453, Russell E. Palmateer, describes a process for the preparation of such compounds from the above-mentioned basic salts. Moreover, the above-mentioned patent illustrates that the basic salt includes an acid and metal in respective molar proportions in excess of those necessary to produce a normal or neutral salt of the metal and the acid with the metal content thereof variable in the range of about one and one-half to three times the amount of metal necessary to produce a normal metal salt. Also, the dried product resulting therefrom when added to sufficient amounts of water is capable of producing a compound having pH in the range of about 3.9 to 5.1.

Regarding applicable solvents, it has been found that numerous solvents including water, alcohol, ether, and many others are appropriate depending upon the compound selected. Further, numerous suitable compound and solvent combinations can be found in the "Handbook of Chemistry and Physics" published by the Chemical Rubber Publishing Co. of 2310 Superior Avenue, NE., Cleveland, Ohio. Additionally, the solvent should be volatile at a temperature lower than the compound decomposition temperature and compatible therewith.

As to the selection of metal particles adapted to the process, the choice thereof is practically unlimited except that the particles should be sinterable. Further, the particle sintering temperature should be higher than the decomposition temperature of the basic salts of the soluble compound. For example, powdered metal particles of nickel, copper, tungsten, iron, lead, and zinc as well as combinations thereof are but a few of the metals applicable to the process. Obviously, the metal selection is dependent upon the type of device as well as the ultimate use of the finished structure.

In carrying out the process, one of the previously soluble compounds is dissolved in a suitable solvent to provide a sufficient quantity of solution whereby all of the particles of a powdered metal batch may be thoroughly wetted. Thereupon, the powdered metal particles are wetted with the solution by any of a multitude of well-known processes for wetting powdered metal particles with a solution.

Having thoroughly wetted the metal particles of a batch with the solution, the batch is simultaneously heated and agitated for a period and at a temperature sufficient to volatilize at least a major portion of the solvents therefrom. During this volatilization period the solution becomes viscous and a tenacious film surrounds each metal particle of the powdered metal batch. At the same time the particles are continuously agitated to prevent attachment therebetween and the formation of a conglomerate mass. Additionally, the continuous agitation of the metal particles enhances the envelopment of each metal particle by the viscous solution.

As the volatilization of the solvent continues, the film surrounding each of the metal particles is dried and adhered thereto. Further, as explained in the previously mentioned Palmateer patent, the dry film is neither powdery nor gelatinous and is not easily removed. Thus, there has been provided a powdered metal mixture wherein each metal particle is surrounded by a tenaciously attached dry film which upon application of sufficient heat thereto will decompose to form refractory oxide particles.

Regarding the heat required for removal of at least a major portion of the solvent and the formation of the dry film surrounding the metal particles, it has been found that a temperature below 250° C. is preferable in order to remove the solvent without dehydrating and decomposing the film surrounding the metal particles. Moreover, it has also been found that the solution with which the metal particles are wetted should provide a dry film having a concentration of compound therein of about 0.01 to 5.00 percent by weight with a range of approximately 0.01 to 0.10 percent by weight of compound to dry coated film being preferred.

Following, the film-covered metal particles may be handled in a manner similar to almost any other powdered metal particles without fear of removing the film therefrom. For instance, the particles may be rolled into a strip, rolled into a strip and compressed to reduce the porosity thereof, formed into a desired configuration, or treated in any of the numerous ways commonly used in powdered metal techniques. One preferred process is to roll the batch into a strip from which a sheet of the solidified metal mixture may be formed.

Subsequently, having completed any of a number of processes for shaping the batch into a desired form, the batch is heated sufficiently to dehydrate and decompose the film into discrete refractory oxide particles. During sintering the metal particles are bonded together thereby entrapping the refractory oxide particles therebetween to provide a solidified metal mixture of homogeneously distributed refractory oxide particles intermediate the bonded metal particles.

It is to be understood that the above-mentioned heating or sintering process may be carried out in a number of ways commonly used to sinter powdered metal particles. For instance, vacuum firing and hydrogen atmosphere firing are frequently used sintering processes and are applicable to the present process. Primarily, sufficient heat must be furnished to decompose the film and bond the metal particles together. Obviously, the quantity of heat required is dependent upon the materials in the film as well as the metal particles selected.

As an example of the process, 12 ml. of an aluminum compound, described in previously mentioned Patent No. 2,179,453, Russell E. Palmateer, was diluted in 500 ml. of methyl alcohol and dispensed onto a five-pound batch of carbonyl nickel powder. This batch was heated and agitated until a major portion of the solvent was volatilized therefrom and each metal particle was surrounded by a dry adherent film having a concentration of about 0.08 percent by weight of aluminum oxide. The film-covered particles were then rolled into strip form and sintered in a hydrogen atmosphere at a temperature of about 750° C. whereupon there was provided a sheet of powdered nickel mixture having a thickness of about 0.022 inch. This resultant sheet had a yield strength 50 percent greater than the same strip without the aluminum oxide additive.

A repeat test of the same materials was made wherein the aluminum oxide concentration of the dry film surrounding the metal particles was approximately 0.03 percent by weight. This material was handled in a manner similar to the previously described material and provided a resultant sheet of powdered nickel mixture having an increased tensile strength of 25 percent and an increased yield strength of 24 percent over the same material without the aluminum oxide additive.

Further, a cathode alloy metal especially adapted for use in electron tube cathodes and designated as Catholoy P–50 by the Superior Tube Company wherein is contained approximately 0.04 percent copper, 0.05 percent (max.) iron, 0.02 percent manganese, 0.05 percent carbon, 0.01 percent (max.) magnesium, 0.02 percent silicon, 0.05 percent (max.) sulphur, 0.01 percent titanium, and 99.50 percent (min.) nickel plus cobalt was prepared in powder form. To this formulation was added approximately 0.06 percent by weight of aluminum oxide to dry film as described above. The film-covered particles were heated in a hydrogen atmosphere for a period of about 15 minutes during which time the temperature thereof rose from approximately 600° C. to 830° C. The resultant bend strength of the material approximated three times the bend strength of a similar material which did not have the refractory oxide added thereto.

Thus, applicant has provided a material having all of the above-mentioned high temperature metallurgical advantages. Further, this material has a uniformity, consistency, and repeatability previously unobtainable. Additionally, unique advantages are realized with the above-mentioned improved process for adding refractory oxide particles to a powdered metal material in such a manner as to provide a homogeneous dispersion thereof in the resultant solidified material.

While there have been shown and described what are at present considered to be the preferred embodiments of the invention, it will be obvious to those skilled in the art that various changes and modifications may be made therein without departing from the scope of the invention as defined by the appended claims.

What is claimed is:

1. A process for manufacturing a solidified metal mixture comprising the steps of:
    wetting powdered metal particles with a volatile solvent solution of a soluble basic salt from the metal group consisting essentially of aluminum, beryllium, titanium, zirconium, hafnium, and thorium, said salt including an acid and metal in respective proportions in excess of those necessary to produce a neutral salt of the metal and the acid;
    heating said wetted particles to volatilize said solvent and agitating said particles during the heating thereof to prevent adherence therebetween, and provide a film thereon; and rolling said film-covered metal particles to form a strip; and
    firing said film-covered particles to decompose said film to refractory oxide particles and sinter said metal particles whereby the oxide particles are substantially uniformly dispersed and entrapped intermediate the metal particles.

2. The process of claim 1 wherein the metal content of said basic salt is in the range of about one and one-half to three times the normal amount of metal necessary to produce a normal metal salt.

3. The process of claim 1 wherein said solvent solution has a pH in the range of about 3.9 to 5.1.

4. The process of claim 1 including the step of shaping said film covered particles prior to decomposing said film by firing.

References Cited by the Examiner

UNITED STATES PATENTS

| | | | |
|---|---|---|---|
| 2,179,453 | 11/1939 | Palmateer | 117—224 |
| 3,175,904 | 3/1965 | Grant et al. | 75—206 |
| 3,176,386 | 4/1965 | Grant et al. | 75—206 X |

CARL D. QUARFORTH, *Primary Examiner.*

L. DEWAYNE RUTLEDGE, *Examiner.*

R. L. GRUDZIECKI, *Assistant Examiner.*